(12) United States Patent
Manasse

(10) Patent No.: US 7,430,091 B2
(45) Date of Patent: Sep. 30, 2008

(54) METHOD AND APPARATUS FOR IMPROVING THE PERFORMANCE OF A DISK DRIVE

(75) Inventor: Mark Steven Manasse, San Francisco, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 11/256,042

(22) Filed: Oct. 21, 2005

(65) Prior Publication Data

US 2007/0091500 A1 Apr. 26, 2007

(51) Int. Cl.
*G11B 5/58* (2006.01)
*G11B 5/596* (2006.01)

(52) U.S. Cl. .................... 360/77.01; 360/75; 360/78.12

(58) Field of Classification Search ............... 360/78.12
See application file for complete search history.

(56) References Cited

U.S. PATENT DOCUMENTS

| | | | | |
|---|---|---|---|---|
| 5,073,833 | A | | 12/1991 | Best et al. ................ 360/77.05 |
| 5,235,478 | A | | 8/1993 | Hoshimi et al. .......... 360/77.08 |
| 5,355,486 | A | * | 10/1994 | Cornaby .................... 718/102 |
| 5,396,379 | A | * | 3/1995 | Mayo ....................... 360/78.07 |
| 5,523,901 | A | * | 6/1996 | Anderson et al. ......... 360/77.08 |
| 5,610,808 | A | * | 3/1997 | Squires et al. .................. 700/2 |
| 6,104,581 | A | | 8/2000 | Huang et al. ............. 360/264.7 |
| 6,236,528 | B1 | | 5/2001 | Katayama et al. ......... 360/77.04 |
| 6,532,121 | B1 | * | 3/2003 | Rust et al. ...................... 360/8 |
| 6,883,062 | B2 | * | 4/2005 | Susnjar ........................ 711/112 |
| 6,934,112 | B2 | * | 8/2005 | Ono et al. ...................... 360/75 |
| 2001/0036034 | A1 | | 11/2001 | Chang et al. .............. 360/78.05 |
| 2002/0060885 | A1 | | 5/2002 | Money ...................... 360/264.4 |
| 2005/0278360 | A1 | * | 12/2005 | Boyd et al. .................. 707/100 |

OTHER PUBLICATIONS

Ruemmler, C., et al., "An introduction to disk drive modeling," *IEEE Computer*, 1994, 27(3), 17-29 (attached pp. 1-17).

Brain, M., "How hard disks work," http://computer.howstuffworks.com/hard-disk.htm/printable, 1-7 Jul. 25, 2005.

Definition, Exclusive disjunction - Wikipedia, the free encyclopedia, http://en.wikipedia.org/wiki/XOR, 1 page Jul. 25, 2005.

Erasure code, Wikipedia, the free encyclopedia, http://en.wikipedia.org/wiki/Erasure_code, 1 page Aug. 09, 2005.

In computer science - Exclusive disjunction - Wikipedia, the free encyclopedia, http://en.wikipedia.org/wiki/XOR, 1 page Jul. 25, 2005.

Merritt, R., "Toshiba ships 'perperdicular' disk drive," *EETimes*, http://www.eetimes.com/news/latest/showArticle.jhtml, 1-2 Aug. 17, 2005.

(Continued)

*Primary Examiner*—Jason C Olson
(74) *Attorney, Agent, or Firm*—Woodcock Washburn LLP

(57) ABSTRACT

An implementation of a disk drive with improved efficiency where a read head supported by a first positioning component is provided and a write head supported by a second positioning component is also provided. By positioning the write head behind the read head at a predetermined angle, the disk drive can execute a "read-before-write" or "read-modify-by-XOR-write" operation by before the platter has rotated a full revolution.

17 Claims, 3 Drawing Sheets

OTHER PUBLICATIONS

Party checking - What is parity checking? —A word definition from the Webopedia Computer Dictionary, http://www.webopedia.com/TERM/p/parity_checking.html, 1-3 Dec. 12, 2005.

Raid - What is RAID? —A word definition from the Webopedia Computer Dictionary, http://www.webopedia.com/TERM/R/RAID.html, 1-4 Dec. 12, 2005.

Ruemmler, C., et al., "An introduction to disk drive modeling," *IEEE Computer*, 1994, 27(3), 17-29 (attached pp. 1-17).

Sector - What is sector?—Word definition from the Webopedia Computer Dictionary, http://www.webopedia.com/TERM/s/sector.html, 1-3 Dec. 12, 2005.

Tornado codes - Wikipedia, the free encyclopedia, http://en.wikipedia.org/wiki/Tornado_codes, 1 page Aug. 09, 2005.

XOR operator - What is XOR operator? —A word definition from the Webopedia Computer Dictionary, http://webopedia.com/TERM/X/XOR_operator.html, 1 page Jul. 25, 2005.

\* cited by examiner

METHOD AND APPARATUS FOR IMPROVING THE PERFORMANCE OF A DISK DRIVE

FIELD

The method and apparatus relate to magnetic information storage and retrieval and more specifically to a disk drive with improved performance.

BACKGROUND

An essential component of most modem electronic appliances, including computers, is a disk drive for storing information on magnetic disks or platters. In a hard disk, magnetic recording material is layered onto a high-precision platter (disk) (usually made of glass or aluminum). Typically, the information is stored in concentric tracks usually divided into sectors.

The disk drive includes a reading and recording head (head), a positioning component and a controller. A typical positioning component includes an actuator arm to position the head on the right track on the magnetic platter and a track following system that keeps the head in place.

The actuator arm is controlled by the controller, so that the head, in an initial position, is moved to a target track position. That is referred to as the "seek" phase.

In the seek phase, the actuator arm goes through five phases. In the "speedup" phase the actuator arm is accelerated until it reaches half of the seek distance or a fixed maximum velocity. The actuator arm then enters the "coast" phase where the actuator arm keeps moving at a steady speed. The actuator arm the enters the "slowdown" phase where then the actuator arm is brought to rest very near to the target track. The final phase is the "settle" phase where the controller adjusts the head to access the target track. Once the head is on the right track the controller keeps the head on the desired track until the completion of the data transfer. That is referred to as the "tracking" phase.

During the settling phase the head will oscillate on the desired frack for some time as the controller transitions from the seek phase to the tracking phase. Data written while the head is oscillating may not be reliably stored thereby making the data unreadable . To avoid this problem, the controller prevents a write operations for a predetermined time after the transition from the seek mode to the track following mode.

Similarly, a reading operation may be prevented for some time following the transition from seed to track to avoid data from adjacent tracks being inadertently read. The delay of such read and write operations decreases th ferformance of the disk druve.

The inefficiency is also seen in erasure-encoded disks during read-before-write and read-modify-write poerations. In a typical disk drive, the operationsare more time consuming than a write operation by nearly a full rotation of the platters, which, for current disks 3 to 12 milliseconds. For many applications this insighficant but for others the amount of buffering required to hide latency would be onerous.

As an example, consider a computer calculation of a parity value: the "exclusive-or "(a Boolean operator that returns a value of TRUE only both its operands have different value) of data values A and B. Each write to the platter is best done by reading the previous value, writing the new value, then computing D, the difference (i.e. exclusive-or) between the old and new values. To maintain a parity value, we must then replace the previous parity value with the difference between its old value and D.

In a typical disk drive, the positioning component will move the head into the right general neighborhood of the track currently being read or written, and then make fine adjustments to the head position until it is actually above the correct track. Tn the case of a read operation, once the data on the surface can be resolved to be the correct sector of the correct track, the result can be returned; the low-level error-correcting cpdes allow the platter to verify that the bits that have been read all belong to the desired sector. For a write operation, the process takes more time (about 2 milliseconds), because the position of the disk head continues to oscillate slightly. Performing a write operation during these oscillations could be problematic: the data bits written might belong to a sector on a neighboring track, whose value would then be corrupt. While the low-level error-correcting codes on a platter can cope with a small number of such miswrites, a large number would result in the loss of the data from the neighboring sector. As disks become smaller and track densities increase, the fraction of the total seek time attributed to the settle phase increases.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

In an implementation, a disk drive is provided with a second head disposed behind the first head at a distance that enables the second head to write on a sector read by the first head without incurring the cost of a second rotational pass.

In another implementation a method of improving the efficiency of a disk drive is provided that includes the steps of reading a sector with a first head and writing on the sector with a second head before the platter has rotated a full revolution.

BRIEF DESCRIPTION OF THE DRAWINGS

The same numbers are used throughout the drawings to reference like features and components. The design, structure, and functional configurations of the disk drive illustrated in the drawings are merely exemplary to illustrate various features and aspects of an improved efficiency disk drive. Any number of different user components, structures, and functions may be implemented in varying configurations to implement embodiments of the improved disk drive.

DETAILED DESCRIPTION OF ILLUSTRATIVE EMBODIMENTS

Figure 1:
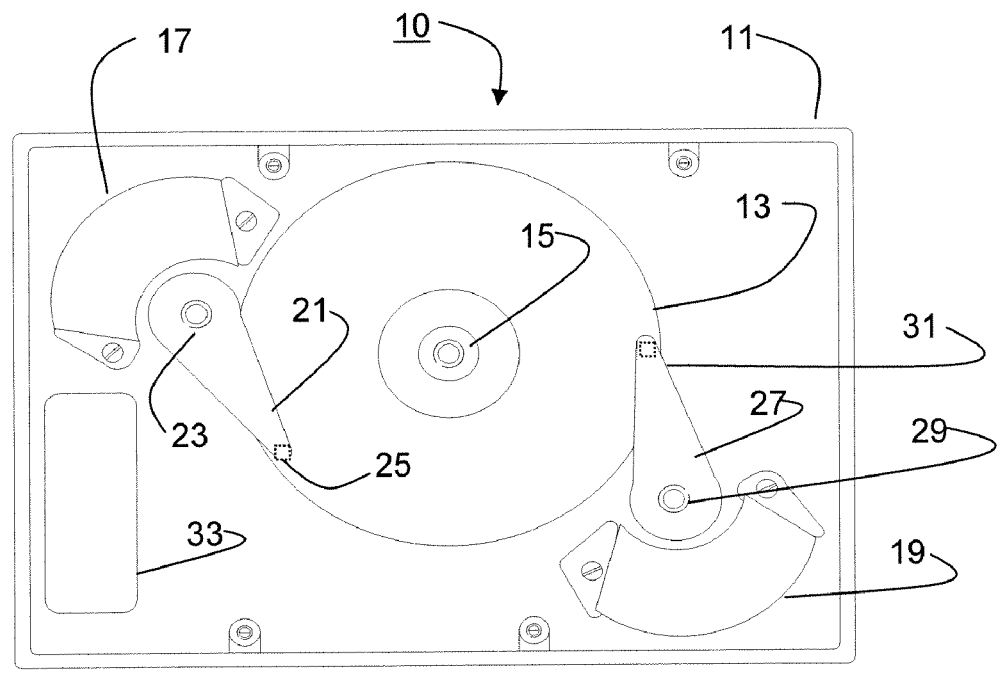
FIG. 1 illustrates various components of a disk drive in which an exemplary embodiment of an improved efficiency disk drive can be implemented.

FIG. 1 illustrates an embodiment of the improved efficiency disk drive 10. Disk drive 10 includes a housing 11 designed to house the components of the disk drive 10. A platter 13 is positioned on a spindle 15 that is driven by a spindle motor (not shown). Although only one platter 13 is illustrated in FIG. 1, the disk drive may include a plurality of platters 13 disposed on the spindle 15. The spindle motor spins the platter at a high rate of angular speed. For example, existing disk drives have angular rotation speeds of 3,600 rpm or 7,200 rpm, up to approximately 15,000 rpm. Although the speeds listed above are standard, the embodiment described herein is in no way limited to any specific range of speeds.

The disk drive 10 includes a first actuator assembly 17 and a second actuator assembly 19. The first actuator 17 includes an actuator arm 21 that pivots around pivot point 23. A read transducer, or first head 25 is mounted on actuator arm 21. The second actuator assembly 19 similarly includes an actuator arm 27 pivoting around pivot point and supporting a second head 31 that may be a read/write head. Although it may be beneficial for other purposes to allow both heads to read, and possibly both to write, depending on the economics of doing so, and the physics; to the extent that the mass of the assembly is reduced by having single-purpose heads, we may see a corresponding reduction in the settling time for reading and writing. In any case the read head should be placed ahead (in the torational direction) of the write head by a distance which is roughly equal to the expected difference in settling times for reading and writing.

Figure 5:
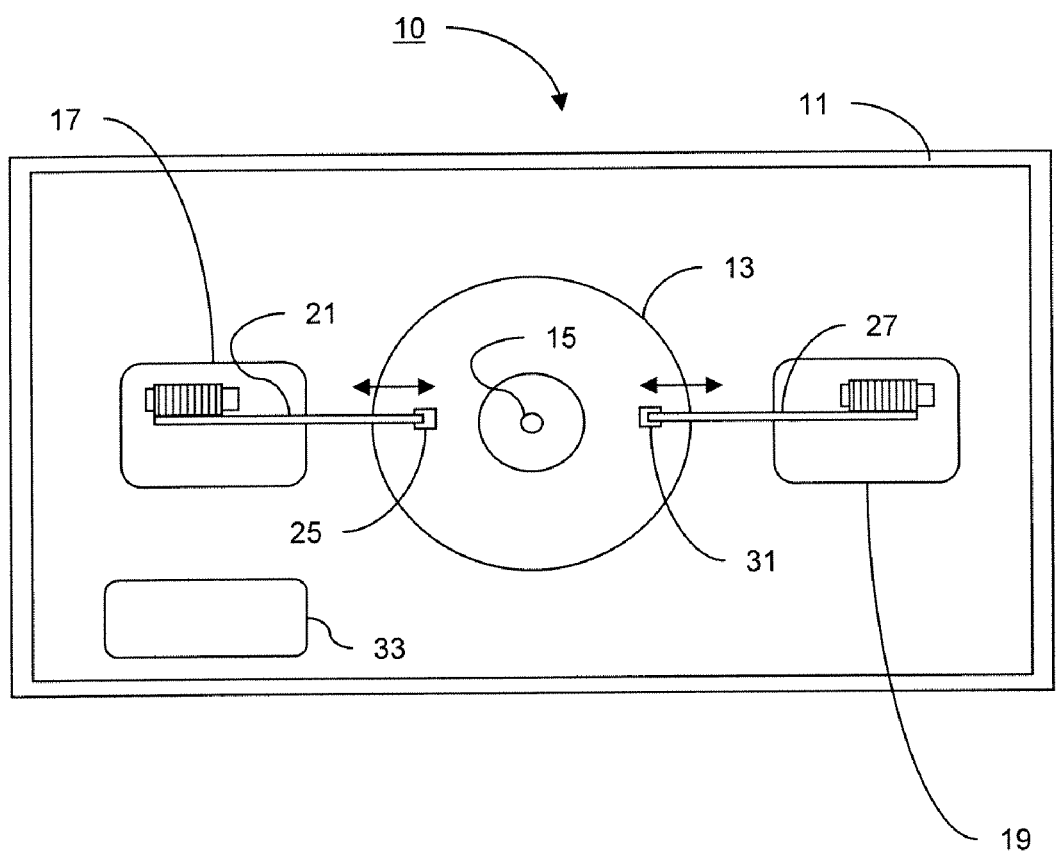
FIG. 5 illustrates an alternate embodiment of an improved efficiency drive with a slider mechanism.

Disk drive 10 also includes read/write chip 33, which cooperates with heads 25 and 31 to read and or write data from and to the platter 13. In operation, the actuator assemblies 17 and 19 position the heads 25 and 31 on the appropriate track of the platter 13. Although in this illustration the mechanism for positioning the heads 25 and 31 are shown as pivoting actuator arms, any other positioning mechanism can be used, such as a slider mechanism (See FIG. 5) that is known in the art and the apparatus disclosed herein is in no way limited to actuator arms.

Figure 2:
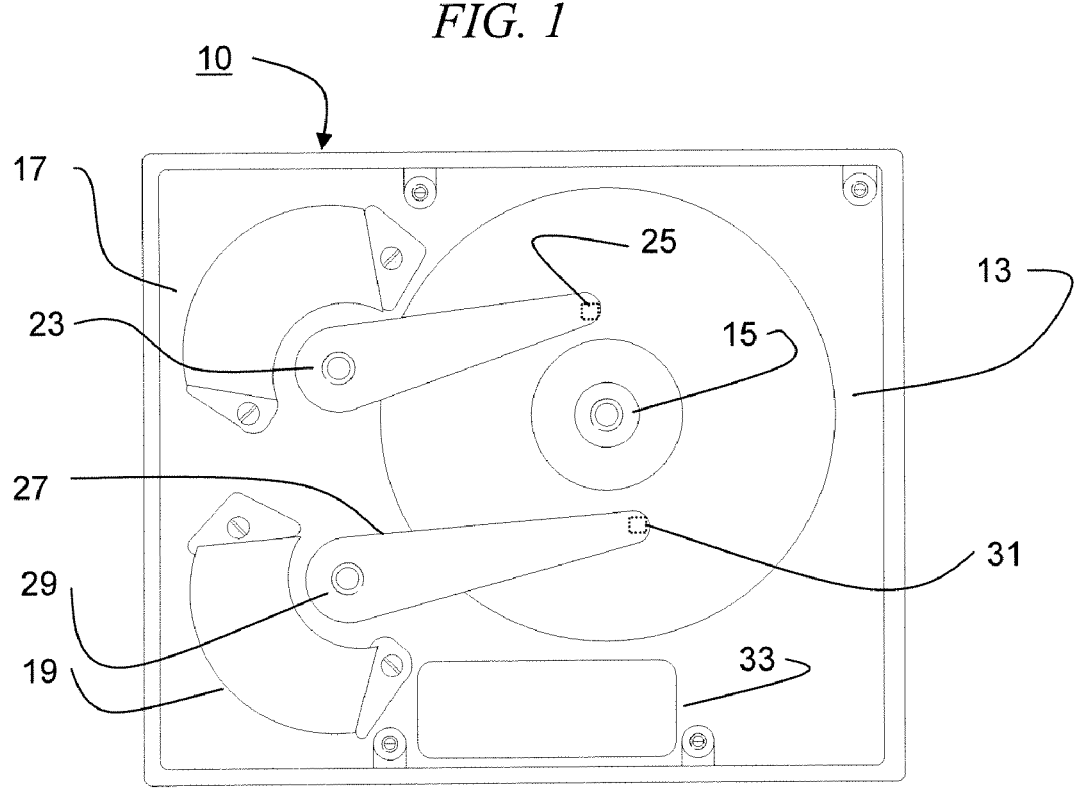
FIG. 2 illustrates an alternate embodiment of an improved efficiency disk drive.

FIG. 2 is an illustration of an alternate embodiment of the disk drive 10, wherein the first actuator assembly 17 is disposed adjacent to the second actuator assembly 19. It should be apparent as a result of this disclosure that the structural design and lay-out of the actuator arm assemblies 17 and 19 may take many forms and the applicant does not intend to be limited to any specific layout illustrated in the drawings.

Figure 3:
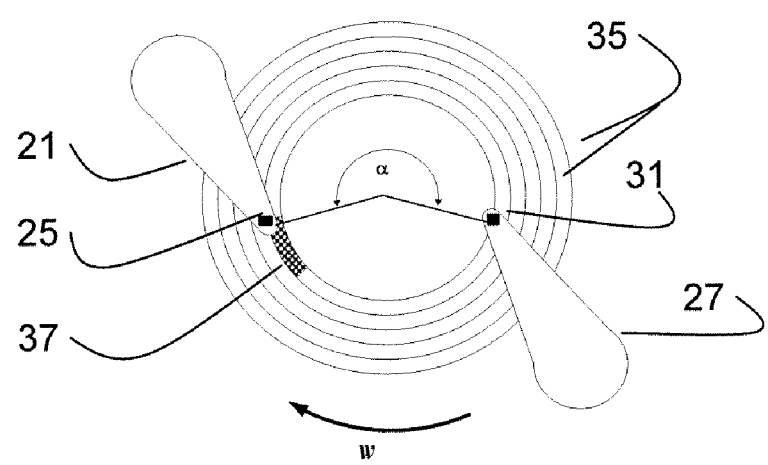
FIG. 3 illustrates the read step of the improved disk drive.

FIG. 3 illustrates the operation of the present embodiment. Platter 13 comprises a plurality of tracks 35, each containing a plurality of sectors 37. Each sector has a fixed number of bytes, and may be grouped into clusters. The tracks and sectors are established during initial formatting, and the starting and end points of each sector are written on the platter. This allows the drive to store blocks of bytes in each sector. The platter may then be formatted at a higher level where the file storage structures such as a file allocation table are written into the sectors.

In FIG. 3 sector 37 is illustrated as positioned below the first head 25 on actuator arm 21. The rotation speed of the platter is indicated as W. Second head 31 on actuator arm 21 is positioned at an angle $\alpha$ (the angular separation) behind the first head 25. The range of values for the angular separation $\alpha$ will vary depending on the speed of the platter and the settle time $t_s$ of the particular platter and disk drive combination for a write operation. For example, in a disk drive where the settle time $t_s$ is $2\times10^{-3}$ sec, and the platter rotation speed W is 3,600 revs/min, the optimal angular separation $\alpha$ would be $$\alpha = W^* t_s = (3.600 \text{ (revs/min)}) * (1 \text{ min}/60\text{sec}) * (360°/1\text{rev}) * (2\times10^{-3} \text{ sec}) = 43.2°.$$

For a disk drive with a rotation speed of 7,200 revs/min the optimal angular separation would be 86.4°. For platters spinning significantly faster, the angular separation might exceed 360°, in which case the angle can be reduced by multiples of 360° to find an offset angle.

Figure 4:
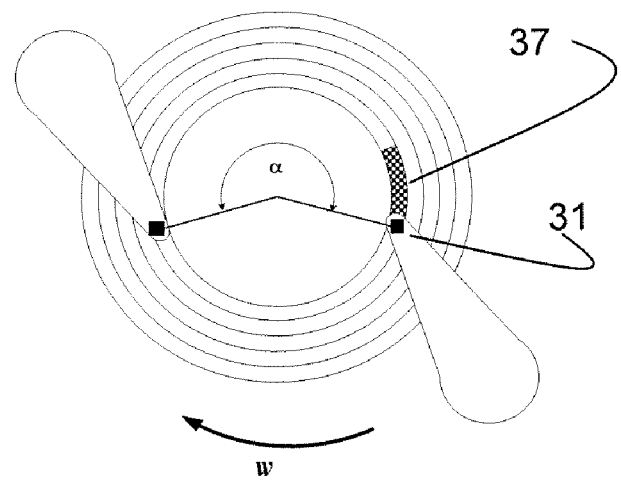
FIG. 4 illustrates write step of the improved disk drive.

From the foregoing, it can be seen that the settling time for a write is about a quarter to a half rotation of the platter. By including a second disk actuator arm and head assembly, preferably at the optimal angular separation, or some physically attainable angle of perhaps 240° to 120° degrees close to the optimal angle, ahead of the existing actuator arm and head assembly, one can be sure that at the time by which a sector 37 passes under a stable write head 31 (See FIG. 4), that same sector 37 will have passed underneath a stable read head 25 two milliseconds earlier (see FIG. 3). The use of a second head provides enough time to perform one of two operations: read-before-write (namely, read and return the old value of a sector, while writing a new value), and read-modify-write-with XOR, namely compute the difference between a sector on platter and a supplied value, and store the difference back into the sector, all with cost equivalent to the cost of a standard write. As long as the assemblies have the same geometry, one can position them by considering the angular distance between a line from fixed point in the assembly to the center of the platter; this angular distance should be sized so that, at the designed rotational speed of the platter, the angular distance corresponds to the difference in read and write settling times. The read settling time is a somewhat nebulous concept, but can be chosen as the time at which a read will read the contents of a sector correctly with a specified (high) probability; the write settling time is chosen by the drive manufacturer to be a time at which a write will destroy neighboring sectors with extremely low probability. Another instruction that may benefit from the mechanisms for positioning the heads described in this disclosure includes an XOR-read-before write instruction. In the case of such instruction the first head is moved to a sector where a datum to be read is positioned and the second head is positioned to write the XOR of the datum to be read, a specified value, or a computed value.

If the two assemblies don't have the same geometry (if, for example, they pivot in opposite directions), one can still bound the range of angular distances established between the heads when addressing the same track. One can establish that the maximum angular distance, and thus the time between a sector passing under the read head and then under the write head, is sufficient to allow for the write head to settle, and that the minimum angular distance provides enough separation most of the time, namely, when the sector has some sufficient fraction of a rotation to perform between the settling of the read head on track, and the sector in question passing under the read head.

Moreover, if both head assemblies are capable of both reading and writing, one can perform the operations with the "wrong" heads, when the rotational position at the time that the two heads settle for reading places the desired sector after the read head, but before the write head.

Because of the slight variability in the settle time depending on the equipment and operations to be performed, the second head may be positioned at an angle greater than, equal to, or slightly less than the optimal angular separation after reducing that separation by multiples of 360°, and still be capable of obtaining efficiency gains.

At least two new operations to the instruction set of the platter are provided. These new operations are: read-before-write, and read-modify-by-XOR-write. Additional operations may be desirable for application beyond simple storage systems, such as performing increments or decrements of certain fields (for performing debit/credit operations in a database), insertions or deletions from a structured value such as a tree node, simple video processing operation, or other computations of sufficient simplicity and regularity and general utility that they can be implemented in the processor of a disk drive.

The illustrative embodiments described in this specification are susceptible to various modifications and alternative constructions. It should be understood, however, that there is no intention to limit the claims to the specific forms disclosed, but on the contrary, the intention is to cover all modifications, alternative constructions, and equivalents falling within the spirit and scope of the specification.

What is claimed:

1. A disk drive comprising:
   one or more platters having a plurality of tracks;
   a first head associated with associated with a surface of a platter;
   a first subsystem that positions said first head;
   a second head associated with said surface of said platter for writing on a data sector on said side of said platter;
   a second subsystem that positions said second head on the same track as the first head and phased at an angle from the first head based upon a determination of an optimal angular separation as measured from the center of the platter; wherein the optimal angle of separation is determined based upon a rotational speed of said one or more platters and a time that it takes to reduce oscillations during a settle phase to effectively transfer data from said track, whereby the second head is able to write on the same data sector read by said first head before the platter has completed a full revolution.

2. The disk drive of claim 1 wherein said first subsystem that positions said first head comprises an actuator arm assembly to position said first head.

3. The disk drive of claim 1 wherein said second subsystem that positions said second head comprises an actuator arm that pivots around a pivot point.

4. The disk drive of claim 1 where said first subsystem that positions the first head comprises a sliding mechanism.

5. The disk drive of claim 1 wherein said first head and second head are capable of reading and writing on said platter.

6. The disk drive of claim 1 further comprising a controller responsive to a read-before-write instruction, said controller causing the first subsystem that positions the first head to move the first head to the sector where a datum is to be read is positioned and causing the second subsystem to position the second head to write a datum in accordance with the read-before-write instruction.

7. The disk drive of claim 1 further comprising a controller responsive to a read-modify-by- XOR-write instruction, said controller causing the first subsystem to move the first head to the sector where a datum to be read is positioned and causing the second head to write a datum in accordance with the read-modify-by- XOR-write instruction.

8. The disk drive of claim 1 further comprising a controller responsive to an XOR-read-before write instruction, said controller causing the first subsystem to move the first head to the sector where a datum to be read is positioned and causing the second head to write the XOR of the datum to be read, a specified value, or a computed value.

9. A disk drive comprising:
   a spindle;
   at least one platter rotatably mounted on said spindle, said planer having a plurality of tracks;
   a first subsystem that reads information on a sector in a track on said platter
   a second subsystem that writes information on said sector, wherein said second subsystem is disposed along the same radius as the first subsystem at an angle based upon a determination of an optimal angular separation, wherein said optimal angular separation is determined based upon a rotational speed of said at least one platter and a time it takes to reduce oscillations during a settle phase to effectively transfer data from said track.

10. The disk drive of claim 9 wherein said first subsystem that reads information comprises a positioning component; a reading head mounted on said positioning component and a controller that controls the movement of the positioning component.

11. The disk drive of claim 9 wherein said second subsystem that writes comprises a positioning component; a writing head mounted on said positioning component and a controller that controls the movement of the positioning component.

12. The disk drive of claim 11 wherein said positioning component comprises a pivotable arm.

13. The disk drive of claim 11 wherein said positioning component comprises a sliding assembly.

14. A method of reading a first datum and writing second datum in a sector on a track on a platter comprising:
   reading the first datum using a first head;
   moving a second head to the same track on which the sector containing the first datum is located, said second head being positioned at an angle based upon a determination of an optimal angular separation , wherein said optimal angle of separation is determined from a rotational speed of said one or more platters and time that it takes to reduce oscillations during a settle phase to effectively transfer data from said track , wherein the determination comprises a product of the rotational speed and the time that it takes to reduce oscillations; and causing the write head to write the second datum on the same sector as the first datum.

15. The method of claim 14 further comprising performing a calculation on said first datum to derive the second datum.

16. The method of claim 14 further comprising:
   providing a read-before-write instruction to a disk drive controller;
   providing a read instruction to a positioning mechanism for the first head; and
   moving said first head to a location proximate to the sector where the first datum is to be read.

17. The method of claim 16 further comprising moving said second head to a location on the same track as the sector where the first datum to be read is located, and providing a write instruction to said second head.

* * * * *

UNITED STATES PATENT AND TRADEMARK OFFICE
CERTIFICATE OF CORRECTION

| | |
|---|---|
| PATENT NO. | : 7,430,091 B2 |
| APPLICATION NO. | : 11/256042 |
| DATED | : September 30, 2008 |
| INVENTOR(S) | : Mark Steven Manasse et al. |

It is certified that error appears in the above-identified patent and that said Letters Patent is hereby corrected as shown below:

In column 1, line 56, after "disks" insert -- takes --.

In column 1, line 57, after "this" insert -- is --.

In column 1, line 58, after "hide" insert -- this --.

In column 1, line 61, after "only" insert -- if --.

In column 3, line 9, after "actuator" insert -- assembly --.

In column 6, line 4, in Claim 9, delete "planer" and insert -- platter --, therefor.

In column 6, line 13, in Claim 9, after "time" insert -- that --.

In column 6, line 36, in Claim 14, delete "separation ," and insert -- separation, --, therefor.

In column 6, line 38, in Claim 14, after "and" insert -- a --.

In column 6, line 40, in Claim 14, delete "track ," and insert -- track, --, therefor.

Signed and Sealed this
Twelfth Day of July, 2011

David J. Kappos
*Director of the United States Patent and Trademark Office*